United States Patent [19]
Shell

[11] Patent Number: 6,134,533
[45] Date of Patent: Oct. 17, 2000

[54] MULTI-LEVEL MARKETING COMPUTER NETWORK SERVER

[76] Inventor: Allyn M. Shell, 13547 Coachlamp La., Silver Spring, Md. 20906

[21] Appl. No.: 08/753,377

[22] Filed: Nov. 25, 1996

[51] Int. Cl.[7] ..................................................... G06F 17/60
[52] U.S. Cl. ............................................... 705/26; 705/14
[58] Field of Search .................................. 705/26, 27, 35, 705/39, 14

[56] References Cited

U.S. PATENT DOCUMENTS

| | | | |
|---|---|---|---|
| 5,267,171 | 11/1993 | Suzuki et al. | 705/26 |
| 5,319,542 | 6/1994 | King, Jr. et al. | 705/27 |
| 5,537,314 | 7/1996 | Kanter | 705/14 |
| 5,634,012 | 5/1997 | Stefik et al. | 395/239 |
| 5,694,546 | 12/1997 | Reisman | 705/26 |
| 5,712,979 | 1/1998 | Graber et al. | 705/14 |
| 5,715,314 | 2/1998 | Payne et al. | 380/24 |
| 5,717,860 | 2/1998 | Graber et al. | 709/227 |
| 5,799,285 | 8/1998 | Klingman | 705/26 |
| 5,809,144 | 9/1998 | Sirbu et al. | 705/26 |
| 5,812,769 | 9/1998 | Graber et al. | 709/228 |
| 5,819,285 | 10/1998 | D'Amico et al. | 707/104 |
| 5,903,647 | 5/1999 | Ronning | 705/26 |

OTHER PUBLICATIONS

Eskow, Dennis. "Amway of the Web.(mutilevel marketing on the Internet)," PC Week, v. 13, No. 40. p. A1–, Dec. 1996.
Fairchild, David. "Internet marketing idea is linking buyers and sellers with products," Kansas City Business Journal, v. 15, No. 11, p. 10, Nov. 1996.
"Amazon,com introduces "Amazon.com Associates"—a new model for Internet–based commerce." Business Wire, Jul. 18, 1996 (retrieved from Dialog, file 16).

*Primary Examiner*—Eric W. Samber
*Assistant Examiner*—Michele Stuckey Crecca

[57] ABSTRACT

A server system for multi-level vending of any electronically transferable product through a communications network directly to a customer's computer. This server system (herein called a Sales Support Server) integrates the collection of a payment via the network and the automatic distribution of the product with the calculation of commissions using a multi-level marketing commission structure and the distribution of commissions and fees via the network. The preferred configuration includes a client application (herein called a Sales App) which runs as a plug-in to a network browser on the customer's computer and which provides a purchase request and registration data to a Sales Support Server and performs the installation of the product on the customer's computer. The Sales Support Server acquires the payment, transfers the product, calculates and pays the commissions, and adds the purchaser's registration information to the multi-level sales database for the product. The usefulness of this invention includes physical product distribution through a shipping and handling system.

12 Claims, 6 Drawing Sheets

Overview of Invention

Overview of Invention

MULTI-LEVEL MARKETING COMPUTER NETWORK SERVER

BACKGROUND TO THE INVENTION

The recent rapid development of the Internet has opened many opportunities for new forms of commerce. This invention was initially conceived as a way to serve the part of the software development community that has been giving away software in the form of "shareware". Shareware is promoted by word-of-mouth on the basis of the impression of value to the users and is circulated free of initial charge with the expectation that prospective users who try the product will willingly pay for the right to continue to use the product. This invention uses the monetary incentive of multi-level marketing to augment "impression of value" to promote the word-of-mouth marketing, and this invention uses direct payment and individualized installation to augment "willingness" as a means for developers to receive payment. The individualized installation can prevent copying the product to other computers and can be built in such a way that prospective customers can have a trial period prior to making the payment and with a reinstallation upon payment. This provides all of the flexibility of shareware with significantly reduced risk to the product developer.

As a note: multi-level marketing is a method of sales promotion in which a commission is paid not only to the seller responsible for making the sale, but also to several levels of sellers that were responsible for distributing knowledge of the product to the seller making the current sale. For instance: a piece of software is sold for $25 and pays commissions of $5 to the person making the sale (the level 1 seller), $3 to the person who informed him of the product (the level 2 seller), $1.50 to the person who informed him (level 3), and $0.50 to the person who informed him (level 4). If the purchaser encourages two sales to people who each encourage two sales to people who each encourage two sales, then the original purchaser receives more money back in commissions than he originally paid for the product, and the product developer gets paid every time.

The usefulness of this invention as a multi-level marketing server includes automatic shipping of hardcopy documentation and other types of products using an automatic shipping system for distribution.

Although many organizations have used computers to calculate commissions for multi-level marketing, none has set forth an invention that provides access directly to the customer to make purchases via a computer network from his own computer. All related prior art has required the involvement of a registered seller or operator with privileges to make sales entries to the computer.

Prior art has also included direct purchases via electronic computer network [1], both those delivered directly via the network and those delivered by automatic shipping systems. None of these direct sales via the network have a multi-level marketing commission capability.

These purchases via the network have involved the use of credit card accounts and/or electronic transfer of funds directly to and/or from bank accounts [2]. They have also used a form of currency that is considered cash on the network. Use of these various forms of cash and credit are simply identified as Method of Payment (from purchaser) and Method of Pay (to sellers and other payees).

SUMMARY OF THE INVENTION

The invention is a server which can be attached to an electronic computer network, such as the Internet, and which accepts purchase requests and payment via the network directly from a customer's computer and vends a product directly to the customer's computer via the network, with the key feature that it calculates and pays multi-level commissions. (see FIG. 1) Herein, this server is called the Sales Support Server. As part of its on-line service, the Sales Support Server accepts purchase requests, acquires the payment, transfers the product, calculates commissions (using a multi-level marketing commission structure), pays the commissions and fees, and adds registration data to the multi-level sales database. The generation of receipts and reports is not within the scope of the invention but is expected to be a part of every implementation of the invention.

The complementary invention is the client application which runs on a customer's general purpose computer attached to the network and which allows a customer to purchase a product via the network. Herein, this client application is called the Sales App. The Sales App allows the customer to view catalog files to extract product information directly from catalog files and/or to make direct entry of product reference information to prepare for a purchase. The Sales App provides the purchase request and any seller registration data to a Sales Support Server. It receives the product, and performs the installation of the product on the customer's computer. Installation can include the setting of some security measures to frustrate improper use of the product. The security measures are not within the scope of the invention. The preferred embodiment for the Sales App is as a plug-in app to a network browser.

The catalog files are owned by a seller and must reside on a network server that the Sales App can locate and use. The catalog not only provides information to the prospective customer regarding the products, but also provides Sale Data direct to the Sales App. This Sale Data includes information on how to contact the Sales Support Server and information to identify the product and the seller. The catalog files are not within the scope of the invention.

Another complementary invention, called a Product Loader, runs on a product developer's general purpose computer and functions as a tool to interface to the Sales Support Server. The Product Loader allows the product developer to prepare a product for distribution by the Sales Support Server by allowing the product developer to identify the product files, to designate the price, multi-level commission structure, and fees, and their recipients. He also uses the Product Loader to transfer the product files and information to the Sales Support Server. The Product Loader could also provide preliminary linkage of the product files with security measures that can be locked by the Sales App during installation to prevent execution of the product if copied to another computer or if used after a free trial period. Linkage of product files and security measures are not within the scope of the invention.

USE OF THE INVENTION

The users that would be involved with this invention and its adjunct applications are the product developers, the Sales Support Server providers, the sellers, and the purchasers. Typical use of the invention involves (1) uploading a product to the Sales Support Server, (2) uploading an initial catalog description page to a network service, (3) purchase of a product using the Sales App, (4) registration of a seller, and (5) calculation and distribution of commissions and fees.

(1) Uploading a Product to the Sales Support Server:

Uploading a product to the Sales Support Server involves the product developer, the product files, the Product Loader, and a Sales Support Server. If the product developer does not have his own Sales Support Server, he must arrange with a Sales Support Server provider for use of one. A typical arrangement with a Sales Support Server provider might include a per sale fee to be paid to the Sales Support Server provider which is shared with other payees the provider designates. The operator of the Sales Support Server designates the fees and the Payee Registration Data that reflect these arrangements to the Sales Support Server.

The operator performs the following steps:

Start "preset new product" function of Sales Support Server,

For any payees not registered on Sales Support Server:
  Enter Payee Personal Identification Data
  Enter Payee Method of Pay Information For each payee to be associated with new product:
  Select payee from list,
  Enter amount of fee, When done record Product Reference ID and total of fees.

The Sales Support Server provider gives the product developer the Sales Support Server Contact Information and the new Product Reference ID. With the completed product files, the price, and commission structure information, the information from the Sales Support Server provider, and the Product Loader, the product developer is ready to upload the product to the Sales Support Server.

The product developer then performs the following steps:

Establish a network connection,

If the purchaser does not have a Product Loader, download Product Loader,

Start the Product Loader,

Designate the Sales Support Server connection information,

Designate the Product Reference ID,

Designate the Product Data:
  Designate the product name,
  Enter the file names of the product files,
  Designate the product price,
  Designate the number of commission levels to be paid,
  For each level, designate the amount of commission,
  Designate the number of additional payees,
  For each additional payee:
    Designate the amount to be paid payee,
    Designate the payee's Personal Identification Data,
    Designate the payee's Method of Pay Information,
  Designate the developer's Personal Identification Data,
  Designate the developer's Method of Pay Information, Verify the Product Data and Payee Registration Data, Authorize initiation of product upload, and Upon receiving the upload complete signal, exit Product Loader.

After uploading a product to the Sales Support Server, the developer should upload a catalog description page to a network service and make a test purchase.

(2) Uploading a Catalog Description Page to a Network Service:

Uploading a catalog description page is done by developers and sellers from their computer to a general purpose network server. If a developer or seller does not have his own network server he will need to arrange with a provider that has this service. The original Product Description is written by the developer. Later the Product Description is either written by the seller or acquired from a similar catalog description page for the same product.

The seller should perform the following actions:

Prepare a catalog description page with the Sale Data in the header,

Uploads the catalog description page to his network service,

Edits his catalog contents page to include a reference to the new catalog description page, Uploads the catalog contents page to his network service, (3) Purchase of a Product:

Purchasing a product directly through the network involves the purchaser, a Sales App, a catalog description page with the Sale Data, and a Sales Support Server with the product of interest. The purchaser must also have the Method of Payment.

To purchase a product the purchaser performs the following steps:

Establish a network connection,

If the purchaser does not have a Sales App, download Sales App,

Start Sales App,

If first time using the Sales App:
  Enter Personal Identification Data, and
  Enter Method of Payment information, (e.g. Credit Card Number)

Find a catalog description page of interest,

Request Sales App to "purchase item",

Validate purchase data which includes:
  Product Name,
  Price, and
  Method of Payment information, Authorize purchase transaction to proceed, (Transaction completes)

Exit Sales App or request to register as a seller (see (4) Registration of a Seller).

When the transaction is complete, the product has been downloaded and installed and the payment has been made.

(4) Registration of a Seller:

The registration of a seller involves the prospective seller, the Sales App, and the Sales Support Server. The registration of a seller can be performed in conjunction with a purchase or separate from a purchase. The seller will need to have a Method of Pay which will in most cases be a bank account to which the Sales Support Server can transfer funds.

To register as a seller the seller performs the following steps:

Start a network connection,

Start Sales App,

If Sales App Local Records are incomplete, enter:
  Personal Identification Data, and
  Method of Pay Information, If not a continuation of a purchase, select or enter the Sale Data of interest, Validate Registration Data, Authorize registration, When registration is complete, exit Sales App.

(5) Calculation and Distribution of Commissions and Fees:

The calculation and distribution of commissions and fees are two processes that are performed by the Sales Support Server after the connection with the purchaser is complete. The calculation of commissions and fees is internal to the Sales Support Server in the preferred configuration. The distribution of commissions and fees involves the Sales Support Server and the designated accounts of the payees, sellers, and developer.

When contacted by the Sales Support Server, the payee's account designated in the Method of Pay, performs the following action:

Receive the designated amount.

DRAWING DESCRIPTIONS

DETAILED DESCRIPTION

Figure 1:
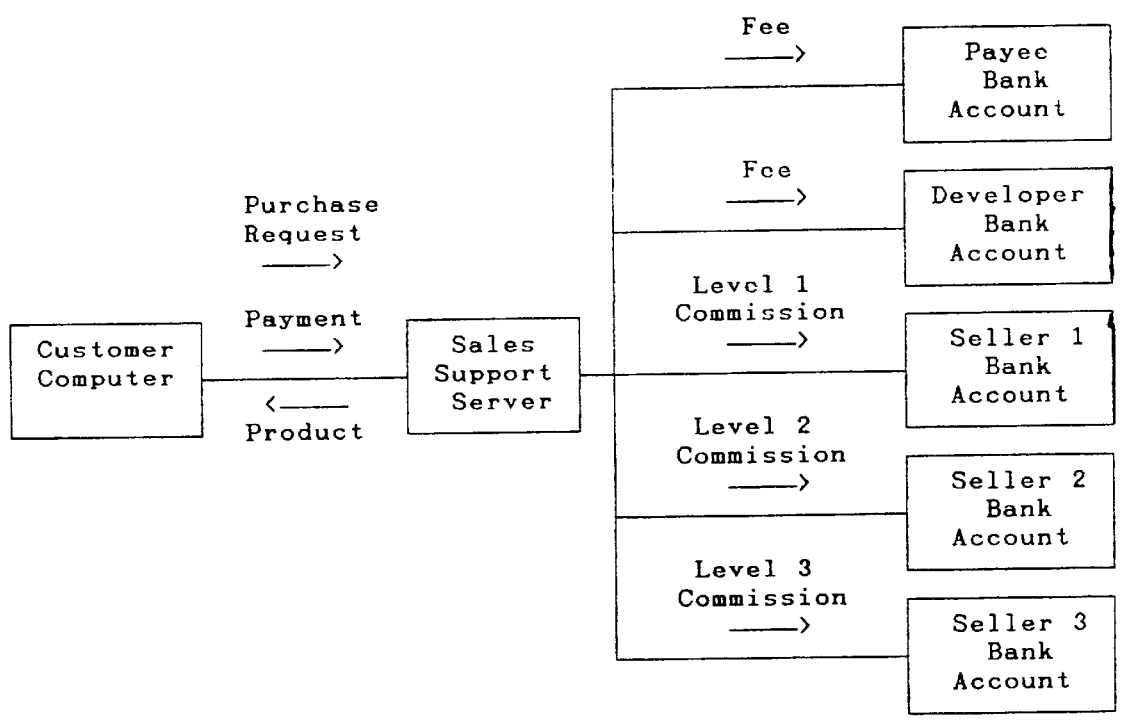
FIG. 1 is a block diagram of the primary items transferred through the network during normal operations.

Sales Support Server:

The Sales Support Server is a general purpose computer network server which has the capability to handle commercial transactions and which has the following data structures and functionality.

The data structures used by the Sales Support Server include:

Payee Selection List-file record

Product Data-file record

Seller (Payee) Registration Data-file record

Purchase Request-communication record

Seller Registration-communication record

The functionality provided by the Sales Support Server includes:

"preset new product" function,

"product upload" connection response,

"sale" connection response,

"registration" connection response, and

"calculate commissions" function.

On the Sales Support Server there is one Payee Selection List, and there are as many Product Data records as there are products that the Sales Support Server vends. A Product Reference ID designates a Product Data record. A product Reference ID may be implied in a Sales Support Server which vends only one product. There is one Seller Registration Data record for each seller of each product. A seller can be any person or organization that registers with the Sales Support Server to sell one of the products the server vends. The Seller Registration Data contain a Next Level Seller Reference ID. A Seller Reference ID is the reference to a Seller Registration Data record. These Next Level Seller Reference IDs form a tree for each product which eventually connect back to the developer's Seller Registration Data. There is also one Seller Registration Data record for each person or organization that is to be paid a fee based on a sale. Payee Registration Data is identical to Seller Registration but does not contain information in its Product Reference ID or Next Level Seller Reference ID. These file records have at least the follow information:

Payee Selection List:

Payee 1 Reference ID

Payee 2 Reference ID

Payee 3 Reference ID etc.

Product Data:

Product Name (for verification)

Basic Price

Number of Product Files

Filename 1

Filename 2

Filename 3 etc.

Number of Paid Fees

Payee 1 Fee (amount of Price)

Payee 1 Reference ID

Payee 2 Fee (amount of Price)

Payee 2 Reference ID etc.

Number of Paid Commission Levels

Level 1 Seller Commission (amount of Price)

Level 2 Seller Commission (amount of Price)

Level 3 Seller Commission (amount of Price)

Level 4 Seller Commission (amount of Price)

etc.

Developer's Reference ID

Seller (Payee) Registration Data:

Personal Identification Data

Method of Pay Information

Product Reference ID (null for Payee)

Next Level Seller Reference ID (null for Payee)

The Sale Data is originally produced by the Product Loader from data supplied by the "upload product" connection response of the Sales Support Server or by the Sale App from data supplied by the "registration" connection response of the Sales Support Server. In either case the seller will place his personal version of the Sale Data in a catalog description page, and a customer operated Sales App will access this data from the catalog description page and use the information to contact the Sales Support Server and to make the Purchase Request.

Sale Data:

Product Name (for verification)

Sales Support Server Contact Information

Seller Reference ID

Product Reference ID

The Purchase Request is comprised of two sets of communication records which could be transferred from the Sales App to the Sales Support Server separately, but they must both be provided for the "sale" connection. The Method of Payment information is entered once by a purchaser into the Sales App which saves the information locally. There is one Purchase Request transferred from the Sales App to the Sales Support Server for each sale.

Purchase Request:

Sale Data

Method of Payment

The Seller Registration is comprised of three sets of communication records which could be transferred from the Sales App to the Sales Support Server separately, but they must all be provided for the "registration" connection. The Personal Identification Data and Method of Pay Information are entered once by a purchaser into the Sales App which saves the information locally. One Seller Registration is transferred from the Sales App to the Sales Support Server for each seller of each product. The same data is used for a Payee Registration which is provided directly by the Sales Support Server operator or is transferred from the Product Loader. Payee Registration is accompanied by fee information.

Seller Registration:

Sale Data

Personal Identification Data

Method of Pay Information

The Sales Support Server provides the "preset new product" function for the local operator. This function allows the Sales Support Server provider to assign payee information so that the provider designated fees get paid automatically with each sale. It also allows the provider to set up the Sales Support Server for new products as needed. The Sales Support Server provides the "product upload" connection response for interaction with the Product Loader which is operated by the developer. The combination of the "preset new product" function and the "product upload" connection response provide all the functionality needed to prepare the Sales Support Server to sell a product.

Figure 2A:
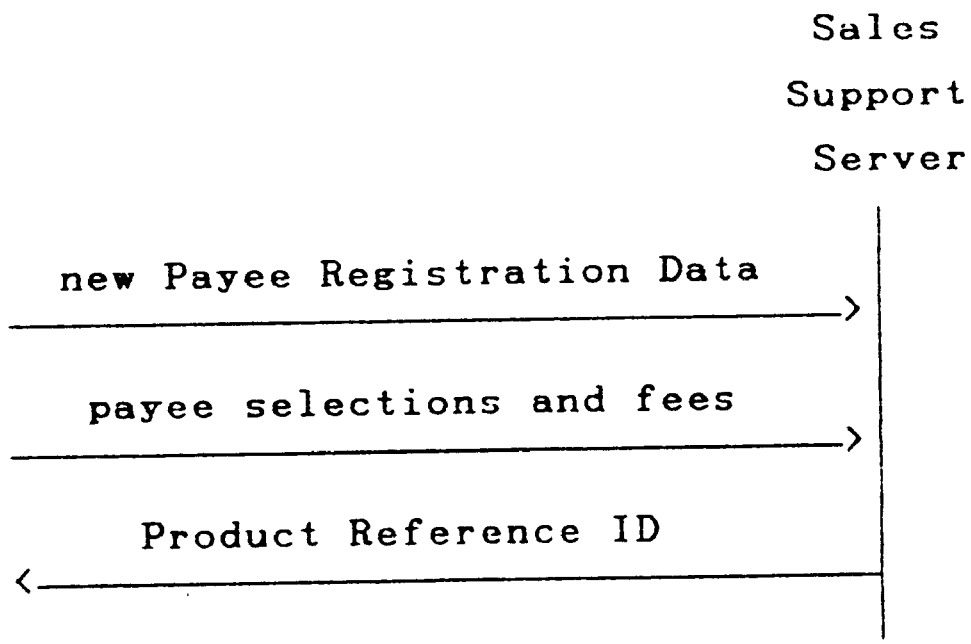
FIGS. 2A–2E are flow diagrams showing the sequence of items that are transferred during each functional operation of the Sales Support Server.

When the Sales Support Server has an operator execute a "preset new product" function, it performs the following actions (see FIG. 2A):

Prepare a new Product Data record,
Prompt for new payee registration data,
For each new Payee:
    Prompt for Payee Personal Identification Data
    Prompt for Payee Method of Pay Information
    Create Payee Registration Data record,
    Add Payee Reference ID to Payee Selection List,
When entry of new payee data is complete, display selection list of Personal Identification Data using Payee Selection List,
For each payee selected by the operator:
    Prompt for amount of fee,
    Store Payee Reference ID and associated Fee in the new Product Data record,
    Redisplay Personal Identification Data for more selections,
Report the new Product Reference ID and total of fees.

Figure 2B:
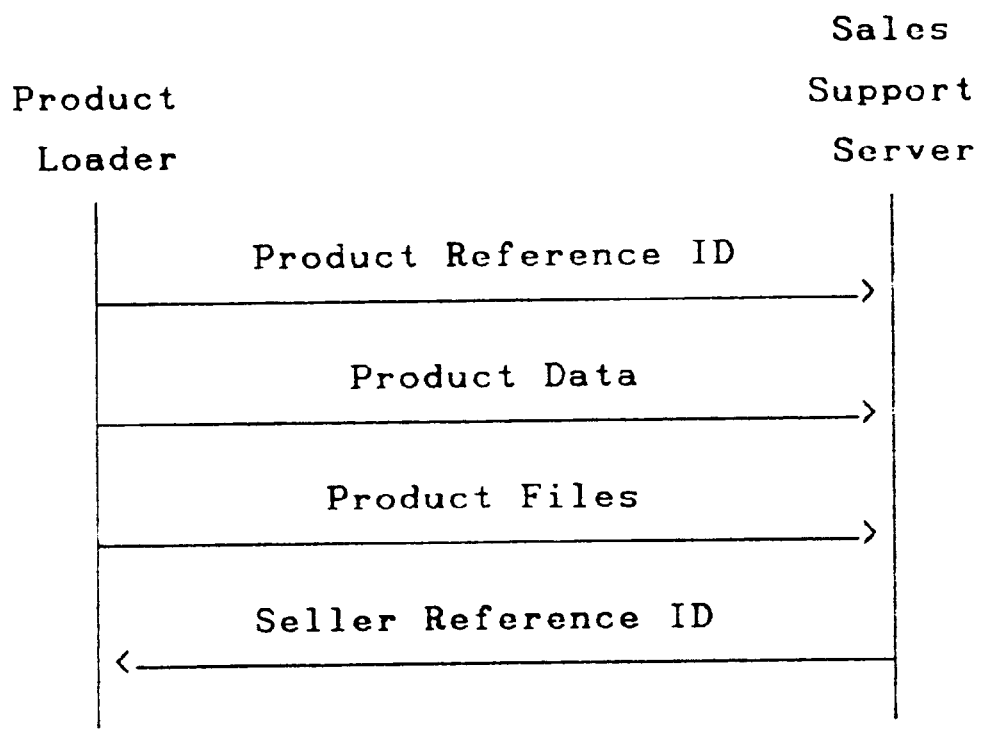

When the Sales Support Server receives a "product upload" connection, it performs the following actions (see FIG. 2B):

Request the new Product Reference ID from the Product Loader,
If the Product Reference ID is invalid:
    The upload process is immediately aborted.
Receive uploaded Product Data and Payee Registration Data from Product Loader,
Store uploaded Product Data and Payee Registration Data with the Payee Registration Data entered by the Sales Support Server provider, (Payee Registration Data includes developer's Seller Registration Data.)
Receive product files from the Product Loader,
Store uploaded product files,
Report the Seller Reference ID assigned to the developer,
Signal Product Loader that upload is complete,
Wait for connection to close, and
Designate product as ready for first purchase.

The Sales Support Server provides the "sale" connection response and "registration" connection response for direct interaction with the Sales App. The "sale" connection response is executed when a customer uses a Sales App to purchase a product. The "registration" connection response is executed when a prospective seller uses a Sales App to register to sell a specific product. When a "registration" connection response occurs in direct conjunction to a "sale" connection response, the original Sale Data can be carried over.

Figure 2C:
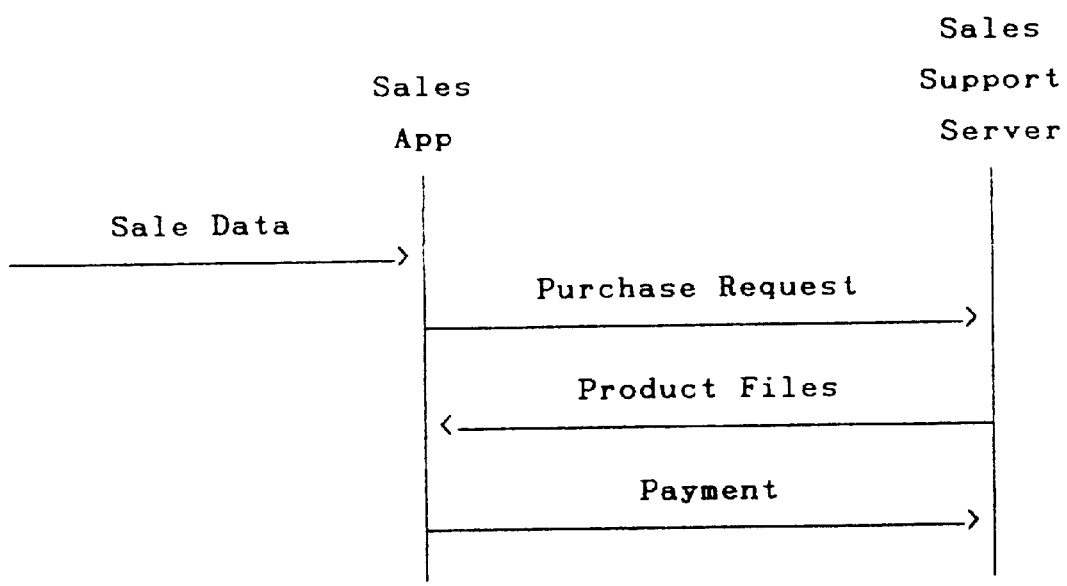

In response to a "sale" connection the Sales Support Server performs the following actions (see FIG. 2C):

Accept Sale Data from Sales App,
Validate that product is available and that seller is registered,
Send Price to Sales App,
Receive Method of Payment information from Sales App,
Verify funds available with Method of Payment,
Using the file names in the Product Data record, download the product files to the Sales App,
Upon receiving the signal that the installation has completed, acquire the payment using the Method of Payment,
Signal the shipping and handling system to send documentation,
Signal the Sales App that payment is received,
Receive transaction complete signal,
If a connection change to a "registration" connection is requested, change connection and give Sale Data,
If a connection is closed, call "calculate commissions" function giving the Product Reference ID, the Seller Reference ID, and the amount paid.

Figure 2D:
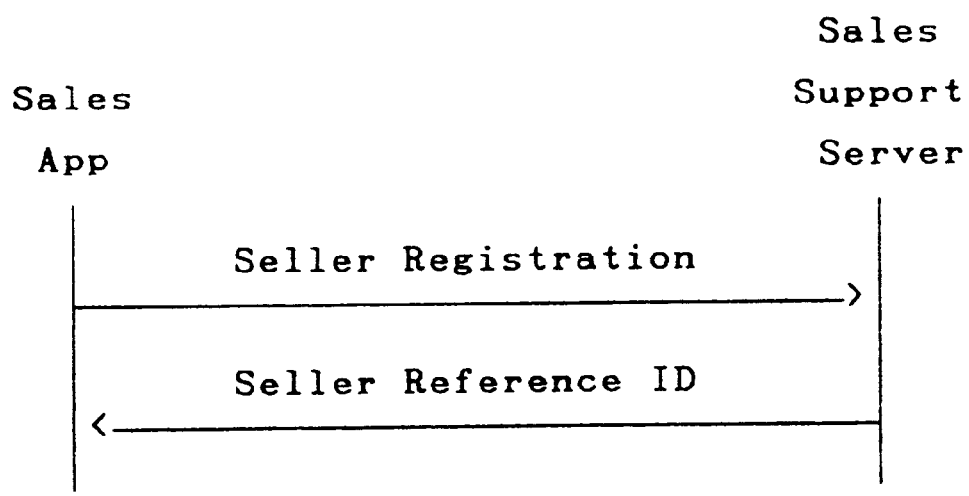

In response to a "registration" connection, the Sales Support Server performs the following actions (see FIG. 2D):

If not a continuation of a "sale" connection:
    Accept original Sale Data associated with registration,
    Validate that product and seller identified in Sale Data are registered,
    Send verification to Sales App,
Set a Temporary Next Level Seller Reference ID from the original Sale Data,
Accept rest of Seller Registration from Sales App,
Create new Seller Registration Data record with information from Seller Registration,
Set the Next Level Seller Reference ID from the Temporary Next Level Seller Reference ID,
Send new Seller Reference ID to the Sales App.
Send a registration complete signal to the Sales App.
If this connection began as a continuation of a "sale" connection, when connection is closed, call "calculate commissions" function giving the Product Reference ID, the original Seller Reference ID, and the amount paid.

The Sales Support Server provides the "calculate commissions" function which is called internally. In the preferred embodiment, this function is called immediately after closing a connection that involved a sale, but with the addition of pending calculations data it could be called less frequently (e.g. once a day). With the addition of a summation of all commission payments and fees for each seller and payee in a given period prior to dispersement, the number of transactions could be reduced slightly or even altered to a monthly paycheck style of pay.

Figure 2E:
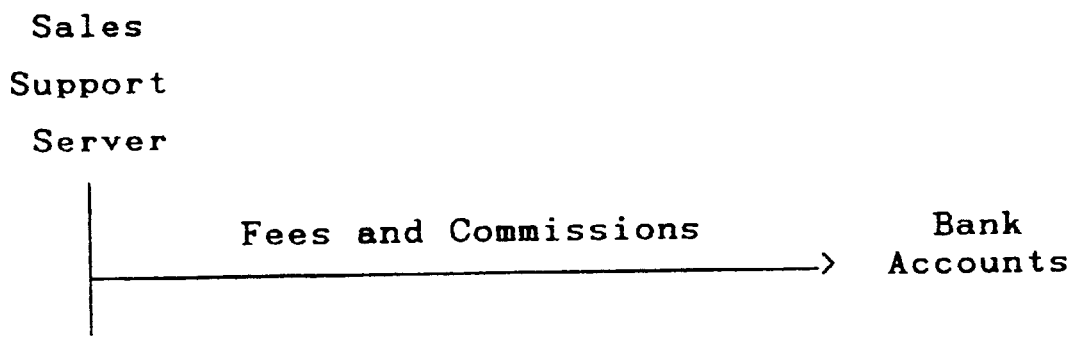

The Sales Support Server calls on its own "calculate commissions" function which performs the following actions (see FIG. 2E):

Given the Product Reference ID, the Seller Reference ID, and the amount paid,
Use the Product Reference ID to find the Fees and Commissions,
For each of the Paid Fees:
    Use the Payee Fee to determine amount to be paid,
    Use the Payee Reference ID to find the Payee Registration Data, Use the Payee Registration Data record to get the Personal Identification Data and Method of Pay, Disperse the determined amount to the payee's account designated by the Method of Pay.

Use the Seller Reference ID to find the Seller Registration Data,

For each of the Paid Commission Levels:
Use the Level Seller Commission to determine amount to be paid,
Use the Seller Registration Data record to get the Personal Identification Data and Method of Pay,
Disperse the determined amount to the seller's account designated by the Method of Pay.
Use the Next Level Seller Reference ID to find the next Seller Registration Data,
If the developer's Seller Registration Data is reached the remaining commissions are assigned to the developer.

Use the Developer's Reference ID to find the developer's Seller Registration Data, Use the Seller Registration Data record to get the Personal Identification Data and Method of Pay, Disperse the remaining amount to the developer's account designated by the Method of Pay.

Sales App:

The Sales App is a plug-in to a network browser which has the capability to transfer files and some form of credit or electronic cash and which has the following data structures and functionality.

The data structures used by the Sales App include:

Sales App Local Records-file record

Sale Data-communication record

Purchase Request-communication record

Seller Registration-communication record

The functionality provided by the Sales App includes:

"purchase item" request function and

"register seller" request function.

The Sales App maintains a local file, the Sales App Local Records. The Purchase History has a Registration Status which identifies either that the Sale Data contains the original Seller Reference ID or that the Sale Data contains a personal Seller Reference ID. The original Seller Reference ID is used to register as a seller for the product, and the personal Seller Reference ID is used to establish a catalog description page for the product.

Sales App Local Records:

Personal Identification Data

Method of Payment (for Purchase)

Method of Pay Information (for Sale)

Number of Products (Purchase History)
Product 1 Sale Data
Product 1 Registration Status
Product 2 Sale Data
Product 2 Registration Status
etc.

The communications records used by the Sales App, Sale Data, Purchase Request, and Seller Registration, are described in the detailed description of the Sales Support server above.

The Sales App provides the "purchase item" request and the "register seller" request for direct interaction with the Sales Support Server. The "purchase item" request is used by a customer to purchase a product. The "register seller" request is used by a prospective seller to register to sell a specific product. The "purchase item" request and the "register seller" request can either be executed sequentially or separately.

In response to the "purchase item" request, the Sales App performs the following actions (see FIG. 2C):
If the Sales App Local Records are incomplete:
Prompt for Personal Identification Data, and
Prompt for Method of Payment information, (e.g. Credit Card Number)
If a catalog description page is available, use catalog description page for Sale Data,
If a catalog description page not is available, prompt purchaser for Sale Data,
Establish a "sale" connection with the Sales Support Server,
Use Sale Data to construct Purchase Request,
Send Purchase Request to Sales Support Server,
Abort sale if Sales Support Server does not have a product and seller that match Sale Data,
Receive Price from Sales Support Server,
Display purchase data which includes:
Product Name,
Price, and
Method of Payment information,
Accept authorization to proceed,
Send Method of Payment information to Sales Support Server,
Receive and store the product files,
Install the product,
Signal the Sales Support Server that the installation is complete,
Upon receiving the signal that the payment was received, issue a receipt to the purchaser,
Assemble and store the Sale Data in the Sales App Local Records,
Signal the Sales Support Server that the transaction is complete,
Prompt the purchaser to register as a seller,
If user wants to register as a seller:
Go to "register seller" request,
If user does not want to register as a seller:
Close the connection to the Sales Support Server.

In response to the "register seller" request the Sales App performs the following actions (see FIG. 2D):
If Sales App Local Records are incomplete, prompt for:
Personal Identification Data, and
Method of Pay Information,
Establish (or change to) a "registration" connection with the Sales Support Server,
If not a continuation of a "purchase item" request:
Display list of Sale Data from Purchase History,
Accept selection of original Sale Data,
Verify Registration Data with seller,
Send the Sale Data to the Sales Support Server for verification,
Send rest of Seller Registration to the Sales Support Server,
Receive new Seller Reference ID,
Display Sale Data with new Seller Reference ID for a catalog description page,
Store the new Sale Data and set Product Registration Status to indicate the seller is registered for this product, Upon receiving registration complete signal, notify seller.

Close connection with server.

Product Loader:

The Product Loader is an application method that runs on a general purpose computer which has a network connection, FTP capabilities, and the product files. The Product Loader has the following data structures and functionality.

The data structures used by the Product Loader includes:

Product Data-communication record

Seller (Payee) Registration Data-communication record

The functionality provided by the Product Loader includes:

"execute" function.

The communications records used by the Product Loader, the Product Data and the Seller Registration Data, are described in the detailed description of the Sales Support server above.

The Product Loader runs the "execute" function for the developer. This function allows the Product Loader to upload Product Files and Product Data information to the Sales Support Server.

When the "execute" function is run, the Product Loader performs the following actions (see FIG. 2B):

Prompt for the Sales Support Server connection information,

Establish a "product upload" connection with the Sales Support Server,

Prompt for the Product Reference ID,

Verify the Product Reference ID with the Sales Support Server,

Prompt for the other Product Data and any additional Payee Registration Data,

Validate entered data,

Upload the Product Data and additional Payee Registration Data to the Sales Support Server, Upload the product files to the Sales Support Server, Request and acquire the developer's Seller Reference ID from the Sales Support Server, Assemble and display Sale Data for a catalog description page, Store the Sale Data locally for later use, Display the upload complete signal, and Close Sales Support Server connection.

The preceeding descriptions of the invention and the several variations mentioned above are illustrative and do not restrict the invention. For example different embodiments of this invention could include variations such as but not restricted to:

The separation and/or reorganization of data in file records and/or communication records, The addition of other kinds of data to file records and/or communication records, Altering terms used in the data structure (eg. calling the "next" seller the "prior seller in the tree of sellers.)

The delegation of data files to a separate server,

The addition of other methods to the Sales Support Server, the Sales App, and/or the Product Loader, The association of a single product with a specific Sales Support Server whereby the Product Reference ID is implied by the Sales Support Server, The separation of the steps of a method into sub methods or separate methods which in combination perform the same function, The delegation of performance of methods to a separate server, The substitution of payment handling methods which acquire a delayed (credit) payment or make a delayed payment of a fee or commission, The delegation of accounting methods for acquiring a payment or paying a fee or commission to a separate system, or The vending of the physical parts of a product by delegating the distribution of those parts to a separate automatic shipping system.

All such variations and combinations of such variations are within the spirit of this invention.

What is claimed is:

1. A system for purchasing electronic products and distributing product-based, multilevel commissions comprising:

means for loading an electronic product, a price, and a predetermined commission structure for the electronic product into a sales server;

means for purchasing an electronic product, identified in a catalog description page which includes the identification of the seller, by accepting a purchase request, authorizing a purchase, and downloading the electronic product to the purchaser's computer;

means for calculating fees and product-based, multilevel commissions for each purchase, wherein the calculation of commissions uses the identification of the seller included with the catalog description page; and means for distributing the calculated fees and commissions to the payees, sellers, and developer;

wherein all said means comprising this system can be distributed over one or more computers.

2. The system of claim 1 further comprising:

means for storing the prior seller's identification as the next level seller to the new seller for the described product;

means for editing the catalog description page to include the identification of the new seller; and means for uploading catalog description page onto a network server.

3. The system of claim 1, wherein the means for loading an electronic product, a price, and a predetermined commission structure for the electronic product into a sales server further comprising:

means for loading all or part of the electronic product, price, and/or predetermined commission structure is performed locally on the sales server.

4. The system of claim 1, wherein the means for loading an electronic product, a price, and a predetermined commission structure for the electronic product into a sales server further comprising:

means for loading all or part of the electronic product, price, and/or predetermined commission structure is performed remotely through a network.

5. The system of claim 1, wherein the means for downloading the electronic product further comprising:

means for installing the electronic product on the computer to which it is downloaded.

6. The system of claim 1, wherein the means for downloading the electronic product further comprising:

means for distributing of physical products associated with the sale via a shipping and handling system.

7. The system of claim 1, wherein the means for distributing the calculated fees and commissions comprising:

means for issuing all or part of the calculated fees and commissions as a check.

8. The system of claim 1, wherein the means for distributing the calculated fees and commissions comprising:

means for disbursing all or part of the calculated fees and commissions to a seller's account.

9. The system of claim 1, wherein the means for distributing the calculated fees and commissions comprising:

means for issuing all or part of the calculated fees and commissions as a credit.

10. The system of claim 1, wherein the means for distributing the calculated fees and commissions comprising:

means for issuing all or part of the calculated fees and commissions as electronic cash.

11. The system of claim 1, wherein the means for calculating fees comprising:

means for storing a record of the identification of the seller and any next level seller of the product loader;

means for setting the fees to be paid to the sellers of the product loader based on a predetermined fee structure; and means for setting other fees based on other predetermined terms.

12. The system of claim 1 further comprising:

means for registering a new seller into the network service, comprising;

means for entering the new seller's personal data;

means for entering the new seller's method of payment;

means for authorizing the registration; and means for assigning a seller's reference identification.

* * * * *